(12) United States Patent
Shahabudeen et al.

(10) Patent No.: US 11,171,840 B2
(45) Date of Patent: Nov. 9, 2021

(54) AUTOMATED VISUAL ASSISTANCE FOR CREATING OR DEBUGGING CONNECTIONS OF A NETWORK DEVICE

(71) Applicant: Gigamon Inc., Santa Clara, CA (US)

(72) Inventors: Namick Peer Mohamed Shahabudeen, Chennai (IN); Gowtham Srinivasan, Chennai (IN); Sowmya Poornachandran, Chennai (IN); Thirumalai Srinivasan Sathiskumar, Chennai (IN)

(73) Assignee: Gigamon Inc., Santa Clara, CA (US)

( * ) Notice: Subject to any disclaimer, the term of this patent is extended or adjusted under 35 U.S.C. 154(b) by 0 days.

(21) Appl. No.: 16/215,420

(22) Filed: Dec. 10, 2018

(65) Prior Publication Data

US 2020/0186437 A1 Jun. 11, 2020

(51) Int. Cl.
*H04L 12/24* (2006.01)
*H04L 12/26* (2006.01)

(52) U.S. Cl.
CPC .......... *H04L 41/22* (2013.01); *H04L 43/0811* (2013.01)

(58) Field of Classification Search
CPC ........ H04L 41/12; H04L 41/22; H04L 41/61; H04L 41/213; H04L 41/248; H04L 41/672; H04L 41/806; H04L 41/816; H04L 43/04; H04L 43/45; H04L 43/50; H04L 43/213; H04L 43/672; H04L 43/805; H04L 43/817; H04L 41/0873; H04L 43/0811; H04L 45/02; H04L 12/24; H04L 12/26

USPC .......................................... 709/224; 708/224
See application file for complete search history.

(56) References Cited

U.S. PATENT DOCUMENTS

| | | | | |
|---|---|---|---|---|
| 7,002,353 B1* | 2/2006 | Lo | ........................... | H04L 1/248 324/533 |
| 7,082,464 B2* | 7/2006 | Hasan | ................. | H04L 41/0213 709/202 |
| 7,310,774 B1* | 12/2007 | Arquie | .................... | H04L 41/12 715/734 |
| 7,349,326 B1* | 3/2008 | Zadikian | ............... | H04L 12/437 370/216 |
| 7,358,745 B1* | 4/2008 | Lo | ........................... | H04L 43/50 324/533 |
| 8,032,939 B2* | 10/2011 | Palnitkar | ................. | H04L 63/08 726/25 |
| 9,686,168 B1* | 6/2017 | Patidar | .................. | G06F 16/951 |
| 10,003,527 B1* | 6/2018 | Sorenson, III | .......... | H04L 45/28 |
| 10,264,332 B1* | 4/2019 | Sable | .................... | H04L 43/045 |

(Continued)

*Primary Examiner* — James N Fiorillo
(74) *Attorney, Agent, or Firm* — Perkins Coie LLP

(57) ABSTRACT

Disclosed are a method and apparatus for assisting in the physical wiring or debugging of connections between devices, which may include one or more network visibility appliances. In at least one embodiment, the computer system receives first user input that specifies a first port of a plurality of selectable physical ports or a connection between the first port and a second port of the plurality of selectable physical ports. At least one of the first port or the second port is on a device that is external to the computer system. In response to the first user input, the computer system sends a first signal to the device to trigger the device to output a first visual indication in proximity to the first port, the first visual indication identifying the first port and a status of at least one of the first port or the connection.

36 Claims, 10 Drawing Sheets

(56) References Cited

U.S. PATENT DOCUMENTS

| | | | |
|---|---|---|---|
| 2004/0024934 A1* | 2/2004 | Webb | H04L 43/0817 710/16 |
| 2006/0031480 A1* | 2/2006 | Nijemcevic | H04L 41/0866 709/224 |
| 2008/0209334 A1* | 8/2008 | Pirbhai | H04L 41/0806 715/736 |
| 2009/0119776 A1* | 5/2009 | Palnitkar | H04W 12/126 726/25 |
| 2013/0212434 A1* | 8/2013 | Janky | H04L 43/50 714/27 |
| 2013/0347103 A1* | 12/2013 | Veteikis | H04L 43/04 726/22 |
| 2014/0153918 A1* | 6/2014 | Hazani | H04B 10/07 398/9 |
| 2014/0280889 A1* | 9/2014 | Nispel | H04L 63/20 709/224 |
| 2014/0311002 A1* | 10/2014 | Meng | G09F 3/02 40/661.02 |
| 2014/0359558 A1* | 12/2014 | Chamberlain | G06F 8/35 717/105 |
| 2016/0094394 A1* | 3/2016 | Sharma | H04L 41/0806 709/223 |
| 2016/0191349 A1* | 6/2016 | Buege | G06F 11/3692 709/224 |
| 2016/0234095 A1* | 8/2016 | Shetty | H04L 45/02 |
| 2017/0054593 A1* | 2/2017 | Borikar | H04L 41/0816 |
| 2017/0075743 A1* | 3/2017 | Zhu | G06F 11/0751 |
| 2018/0006894 A1* | 1/2018 | Power | H04L 41/12 |
| 2018/0145886 A1* | 5/2018 | Rao | H04L 41/22 |
| 2018/0302313 A1* | 10/2018 | Blanchard | H04L 43/0847 |
| 2018/0337828 A1* | 11/2018 | Cohen | H04L 41/12 |
| 2019/0011283 A1* | 1/2019 | Soutar | G01D 4/004 |
| 2019/0044795 A1* | 2/2019 | Boom | H04L 41/0681 |
| 2019/0222485 A1* | 7/2019 | Sethi | H04W 24/06 |
| 2020/0021500 A1* | 1/2020 | Einati | H03K 19/017581 |

* cited by examiner

AUTOMATED VISUAL ASSISTANCE FOR CREATING OR DEBUGGING CONNECTIONS OF A NETWORK DEVICE

FIELD

At least one embodiment of the present disclosure pertains to network devices, and more particularly, to a technique for providing automated visual distance to assist a user in creating or debugging connections of a network device.

BACKGROUND

With the amounts of data traffic on modern computer networks continually increasing, network monitoring and security measures play an increasingly important role in reducing the vulnerability of a network to intrusion, unauthorized access and other security or performance issues. Various types of tools can be deployed in a computer network that process the network traffic and provide monitoring and security services. Examples of such tools include an intrusion detection system (IDS), an intrusion prevention system (IPS), a packet sniffer, a network monitoring system, an application monitoring system, an intrusion detection system, a forensic storage system, and an application security system, among others.

Tools deployed in a network environment are only effective to the extent that the relevant network traffic is visible to them. Existing approaches to providing network traffic visibility include using one or more network appliances (traffic visibility appliances) that are connected to the network and to the tools. In an in-line deployment, packets originating from a source node on a computer network are received by the network appliance, then routed by the network appliance through one or more tools (which are usually but not necessarily directly connected to the network appliance), and then forwarded by the network appliance to the intended destination node. In contrast, in an out-of-band deployment, copies of packets originating from a source node are made by the network appliance and routed to one or more tools, while the original packets are forwarded by the network appliance to the intended destination node.

In some implementations, multiple network appliances can be connected to each other, each of which may be connected to one or more tools. As the number of network appliances and tools increases in a network visibility configuration, the complexity of the associated physical connections also increases. The complexity of the network visibility configuration can present challenges for data center technicians responsible for wiring the physical connections between network appliances and tools. In a typical deployment, there may be hundreds of available physical ports that can potentially be used. Connecting these devices therefore can be a difficult process in which the data center technician must cross-check multiple sources of information, including wiring diagrams and physical boxes, and must have a clear understanding of many devices, slots and ports. The wiring process tends to be very prone to human error resulting in incorrect physical connections. In many instances, incorrect connections are only noticed later, by a network configuration manager, when it may be inconvenient and expensive to correct the errors. Further, since any incorrect connections may initially be identified only at a logical level (e.g., through network management software), it is often still difficult to map that information to the correct physical ports on the correct physical devices in order to fix the error.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

Figure 1:
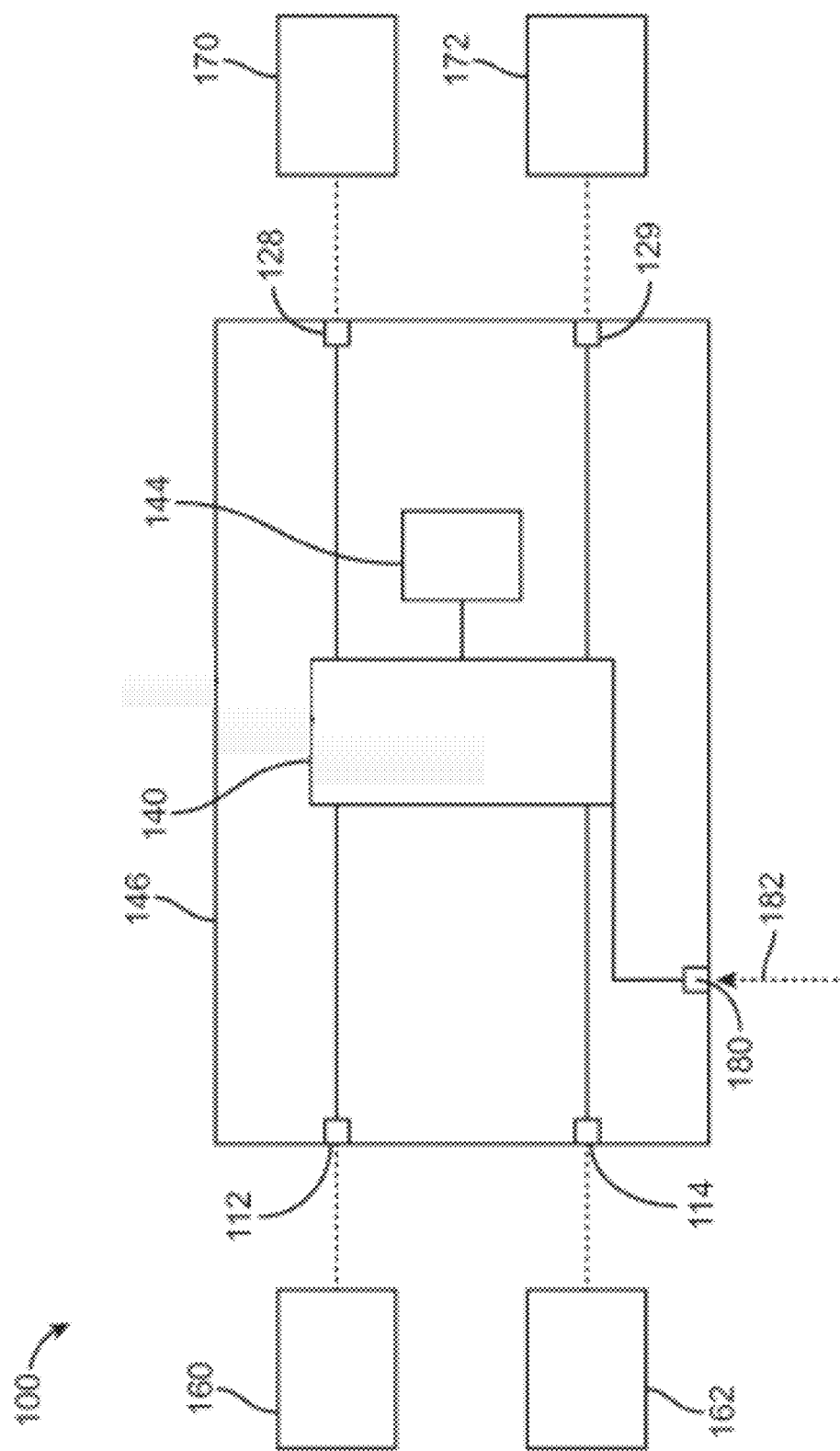
FIG. 1 illustrates an example of a network appliance.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Introduced here are techniques for facilitating the process of wiring and debugging physical connections between electronic devices, including but not limited to devices in a network traffic visibility architecture, and for identifying and correcting problems with such connections. Some of the techniques introduced here can be implemented in a network visibility appliance of the type described above. Other techniques introduced here can be implemented in a separate computer system used to manage one or more such appliances (e.g., in network visibility management software), or partially in such an appliance and partially in a separate computer system that manages the appliance.

The techniques introduced here can be implemented, at least in part, in the form of a so-called "Port Flasher" function, to assist in the physical wiring of connections and/or the debugging of physical connections between devices. In general, each network visibility appliance (hereinafter "network appliance") in a network visibility architecture includes multiple physical ports. These typically include multiple network ports for communicating data to and from devices on a network, and multiple tool ports for communicating data to and from one or more local tools. In accordance with the techniques introduced here, by using the Port Flasher function of the network visibility management software, the physical ports that require physical connection are identified by a flashing light or other visual indicator, to provide the data center technician with an intuitive visual guide to the proper cabling of the connections.

More specifically, each of the physical ports on a device, such as a network appliance, can have an associated indicator, such as a multi-color light emitting diode (LED), located in proximity to the port. The phrase "in proximity to" in this context means that the indicator is close enough to the associated physical port so that the indicator is unambiguously associated with that port, and only with that port. In accordance with the techniques introduced here, to establish a physical (wired) connection between two physical ports located on one or more devices, a technician (e.g., a data center wiring technician or a network administrator) first creates the connection by using a graphical user interface (GUI) in software, such as network visibility management software running on a separate computer system. The separate computer system is in communication with the network appliance(s) that are being managed, via a network. The technician then activates the Port Flash or function by a designated control in the GUI, in response to which the software sends a signal to each of the devices that has a port that belongs to the connection. The signal, when received from the computer system, triggers the device(s) to cause the port indicators for the specific ports that are part of the connection to flash a certain color and/or pattern. In other embodiments, a different type of visual indication may be used. When a port has been connected, the color and/or pattern may change. Additionally, the device on which the port is located may signal the network visibility management software of this fact, which causes the GUI to output a visual indication to the user.

Further details of the techniques introduced here are provided below and in the accompanying drawings. Before discussing those details, however, it is useful to consider an example of a network appliance and an environment in which the network appliance can be used.

FIG. 1 illustrates an example of a device, i.e., a network visibility appliance ("network appliance") 100, in which at least some of the techniques introduced here can be implemented. The network appliance 100 includes a first network port 112, a second network port 114, a first tool port 128, and a second tool port 129. The network appliance 100 also includes a packet switch (switch module) 140 with a processing unit 142, a processor 144, and a network switch housing 146 for containing the packet switch 140 and the processor 144. In the illustrated embodiments, the network appliance 100 also includes other components, such as a Network PHY (not shown) coupled to each of the respective ports 112, 114, wherein the Network PHYs may be parts of the packet switch 140. Alternatively, the Network PHYs may be components that are separate from the integrated circuit 140. The PHY is configured to connect a link layer device to a physical medium such as an optical fiber, copper cable, etc. In other embodiments, instead of the PHY, the network appliance 100 may include an optical transceiver, or a SERDES, etc. The housing 146 allows the network appliance 100 to be carried, transported, sold, and/or operated as a single unit. The ports 112, 114, 128, 129 are located at a periphery of the housing 146. In other embodiments, the ports 112, 114, 128, 129 may be located at other locations relative to the housing 146. Although two network ports 112, 114 are shown, in other embodiments the network appliance 100 may include more than two network ports. Also, although two tool ports 128, 129 are shown, in other embodiments, the network appliance 100 may include only one tool port, or more than two tool ports.

During use, the first network port 112 of the network appliance 100 is communicatively coupled (e.g., via a network, such as the Internet) to a first node 160, and the second port 114 is communicatively coupled (e.g., via a network, such as the Internet) to a second node 162. The network appliance 100 is configured to communicate packets between the first and second nodes 160, 162 via the network ports 112, 114. Also, during use, the tool ports 128, 129 of the network appliance 100 are communicatively coupled to respective tools 170, 172. The tools 170, 172 may include, for example, one or more of an IDS, IPS, packet sniffer, monitoring system, etc. The tools 170, 172 may be directly coupled to the network appliance 100, or communicatively coupled to the network appliance 100 through the network (e.g., Internet). In some cases, the network appliance 100 is provided as a single unit that allows the network appliance 100 to be deployed at a single point along a communication path. In the illustrated embodiments, the packet switch 140 is configured to receive packets from nodes 160, 162 via the network ports 112, 114, and process the packets in accordance with a predefined scheme. For example, the packet switch 140 may pass packets received from one or more nodes to one or more tools that are connected to respective tool port(s) 128, 129. In some embodiments, one or more of the network ports 112, 114 may be configured to receive normal packets (e.g., packets not from a virtualized network), as well as virtualized packets (e.g., packets with tunnel format that includes encapsulation of the original packets resulted from virtualization technology). In other embodiments, one or more the network ports 112, 114 may be configured to receive only virtualized packets.

In one or more embodiments, the packet switch 140 may be any switch module that provides packet transmission in accordance with a predetermined transmission scheme (e.g., a policy). In some embodiments, the packet switch 140 may be user-configurable such that packets may be transmitted in a one-to-one configuration (i.e., from one network port to an tool port). As used in this specification, the term "tool port" refers to any port that is configured to transmit packets to or to receive packets from a tool. The tool may be an out-of-band device (i.e., it can only receive packets intended to be communicated between two nodes, and cannot transmit such packets downstream), such as a sniffer, a network monitoring system, an application monitoring system, an IDS, a forensic storage system, an application security system, etc.; or the tool may be an in-line device (i.e., it can receive packets, and transmit the packets back to the network appliance 100 after the packets have been processed), such as an IPS. In other embodiments, the packet switch 140 may be configured such that the packets may be transmitted in a one-to-many configuration (i.e., from one network port to multiple tool ports). In other embodiments, the packet switch 140 may be configured such that the packets may be transmitted in a many-to-many configuration (i.e., from multiple network ports to multiple tool ports). In further embodiments, the packet switch 140 may be configured such that the packets may be transmitted in a many-to-one configuration (i.e., from multiple network ports to one tool port). In some embodiments, the one-to-one, one-to-many, many-to-many, and many-to-one configurations are all available for allowing a user to selectively configure the network appliance 100 so that the packets (or certain types of packets) are routed according to any one of these configurations. In some embodiments, the packet movement configuration is predetermined such that when the network appliance 100 receives the packets, the network appliance 100 will automatically forward the packets to the ports based on the predetermined packet movement configuration (e.g., one-to-one, one-to-many, many-to-many, and many-to-one) without the need to analyze the packets (e.g., without the need to examine the header, determine the type of packets, etc.).

Examples of network appliance 100 that may be used to implement features described herein include any of the commercially available GigaVUE™ series of network visibility appliances available from Gigamon Inc. of Santa Clara, Calif.

The processing unit 144 may be implemented using a processor, such as a general-purpose programmable microprocessor, an application specific integrated circuit (ASIC) processor, a field programmable gate array (FPGA), or other convenient type of circuitry.

Figure 2:
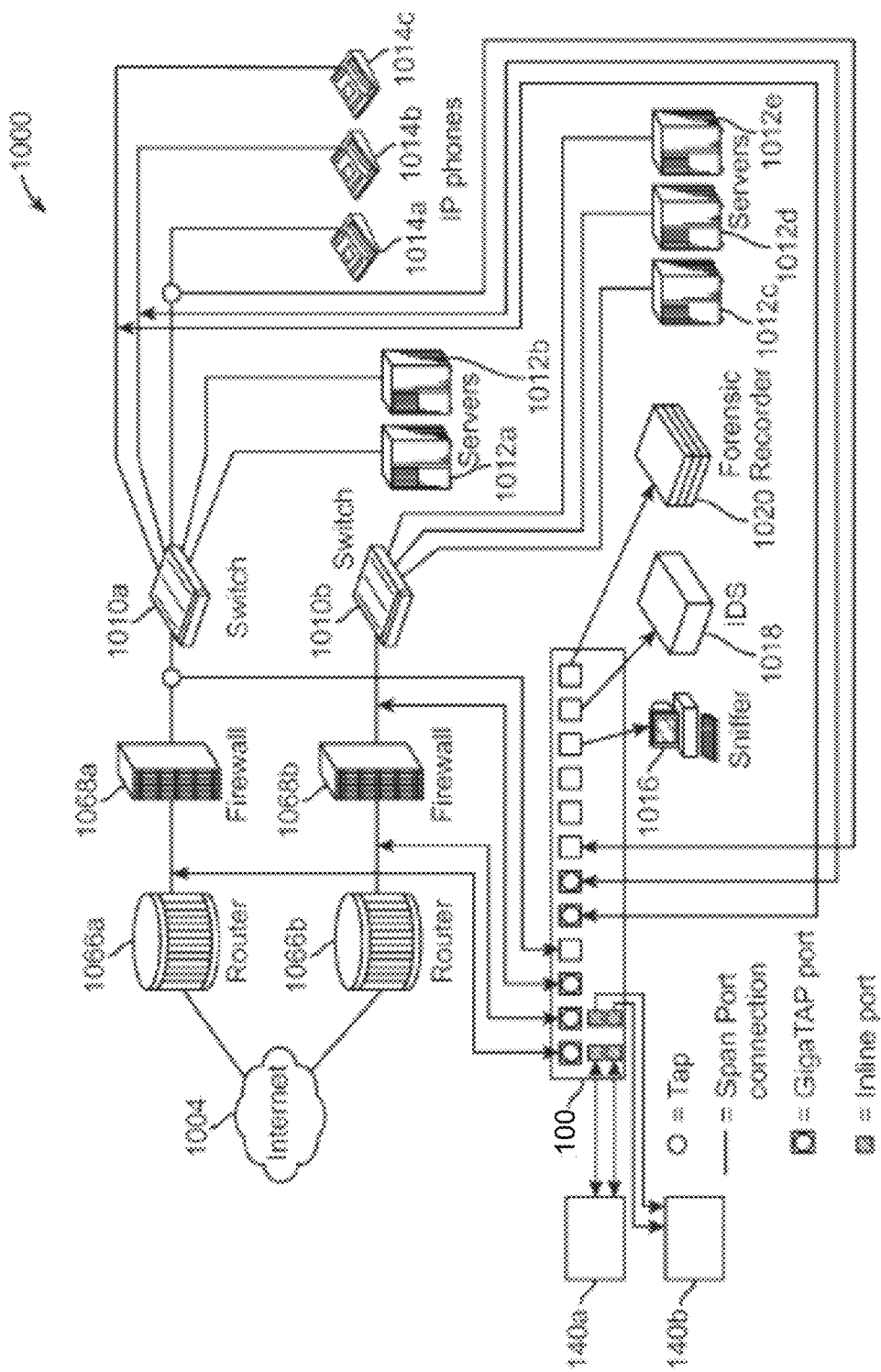
FIG. 2 illustrates an example of a deployment of a network appliance.

FIG. 2 shows an example of a deployment of the network appliance 200 in a network environment 1000. Network appliance 200 can be in accordance with network appliance 100 in FIG. 1. The Internet 1004 is coupled via routers 1006a-b and firewalls 1068a-b to two switches 1010a and 1010b. Switch 1010a is coupled to servers 1012a-b and IP phones 1014a-c. Switch 1010b is coupled to servers 1012c-e. A sniffer 1016, an IDS 1018 and a forensic recorder 1020 (collectively, "out-of-band tools") are coupled to the network appliance 200. The same out-of-band tools can access information anywhere in the network environment 1000 through the network appliance 200. The user has the flexibility to channel whatever traffic to whatever tool or groups of out-of-band tools, using the any-to-any, any-to-many and many-to-one capability of the system in accordance with the different embodiments described herein. For example, all the conversations of the IP phones 1014a-c can be easily configured to be sent to an IDS 1018. It is also possible that traffic inside a particular IP phone 1014a-c connection can be sent to a sniffer 1016, and IDS 1018 and a forensic recorder 1020 simultaneously via the one-to-many function.

In some embodiments, when using the network appliance 200, one or more out-of-band tools (such as IDS, sniffer, forensic recorder, etc.) may be connected to some tool port(s) of the network appliance 200, and one or more in-line tools 140a, 140b (e.g., IPS) may be connected to other tool port(s) (e.g., inline port(s)) of the network appliance 200. Such configuration allows out-of-band tool(s) and in-line tool(s) to simultaneously monitor and/or regulate network traffic.

Figure 3A:
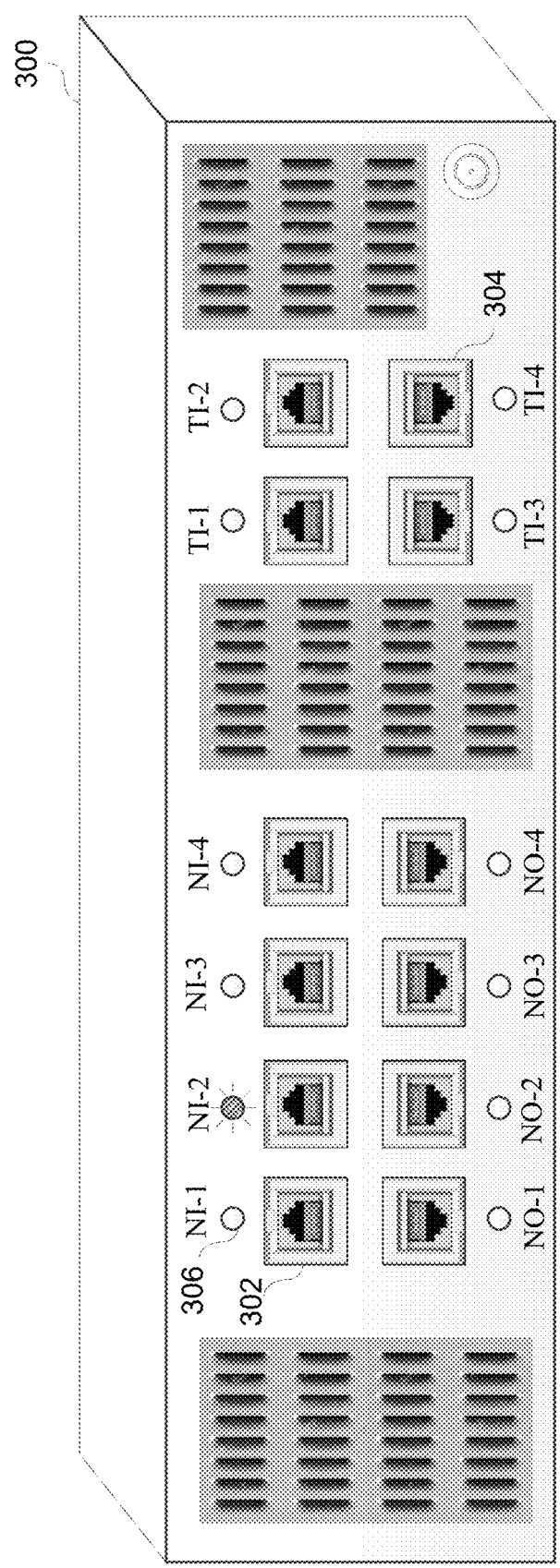
FIG. 3A shows an example of an external view of a network appliance.
Figure 3B:
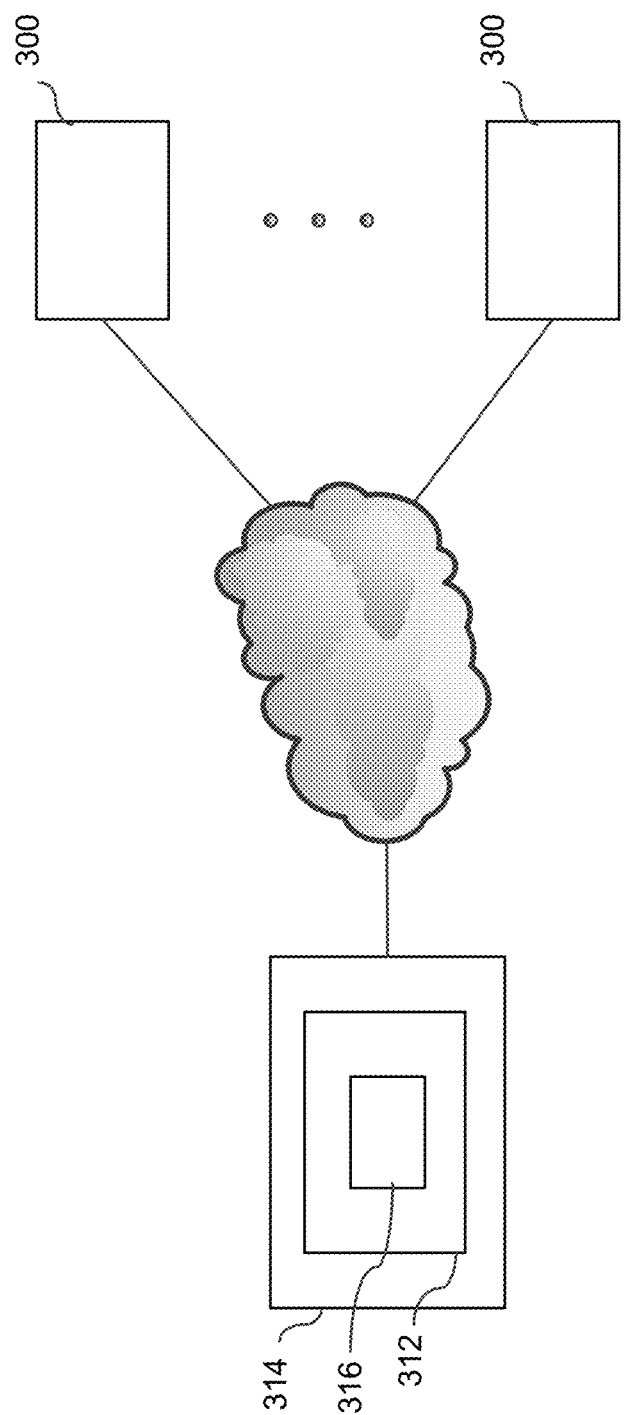
FIG. 3B shows how one or more network appliances can be connected via a network to network visibility management software running on a separate computer system.

FIG. 3A shows an example of an external view of a network appliance 300. FIG. 3B shows how one or more network appliances 300 can be connected via a network (e.g., a local area network (LAN)) to network visibility management software 312 running on a separate computer system 314. To simplify illustration, the tools, network data sources and destinations are not shown in FIG. 3B. A network appliance 300 in FIGS. 3A and 3B can be in accordance with network appliance 100 in FIG. 1 and/or network appliance 200 in FIG. 2.

As shown in FIG. 3A, a network appliance 300 has a number of (physical) network ports 302 and a number of (physical) tool ports 304. Each of the network ports 302 and each of the tool ports 304 has its own visual indicator (e.g., a multi-color LED) 306 associated with it, located in proximity to the port, as shown. When a particular port 302 or 304 on a network appliance 300 is to be physically connected to another port (which may be on the same network appliance or on another device), a user first defines the connection by using a GUI 316 of the network visibility management software 312, by specifying the physical ports that form the connection's endpoints. An example of software in which the functionality of software 312 can be embodied is the GigaVUE-FM software available from Gigamon Inc., of Santa Clara, Calif. A predefined user input applied to the GUI 316 then causes the software 312 to send a specified signal to each network appliance 300 and/or other device that has a port that defines an endpoint of the connection. The signal contains information identifying the specific port of that device that is to be connected. In response to the signal, a processor in each receiving device (e.g., a network appliance 30) causes the indicator 306 for the port identified by the signal to flash in a predetermined pattern and/or color. FIG. 3, for example, shows a situation in which network port NI-2 is flashing, to indicate that is to be physically connected to another port (e.g., on another box, not shown).

Figure 4A:
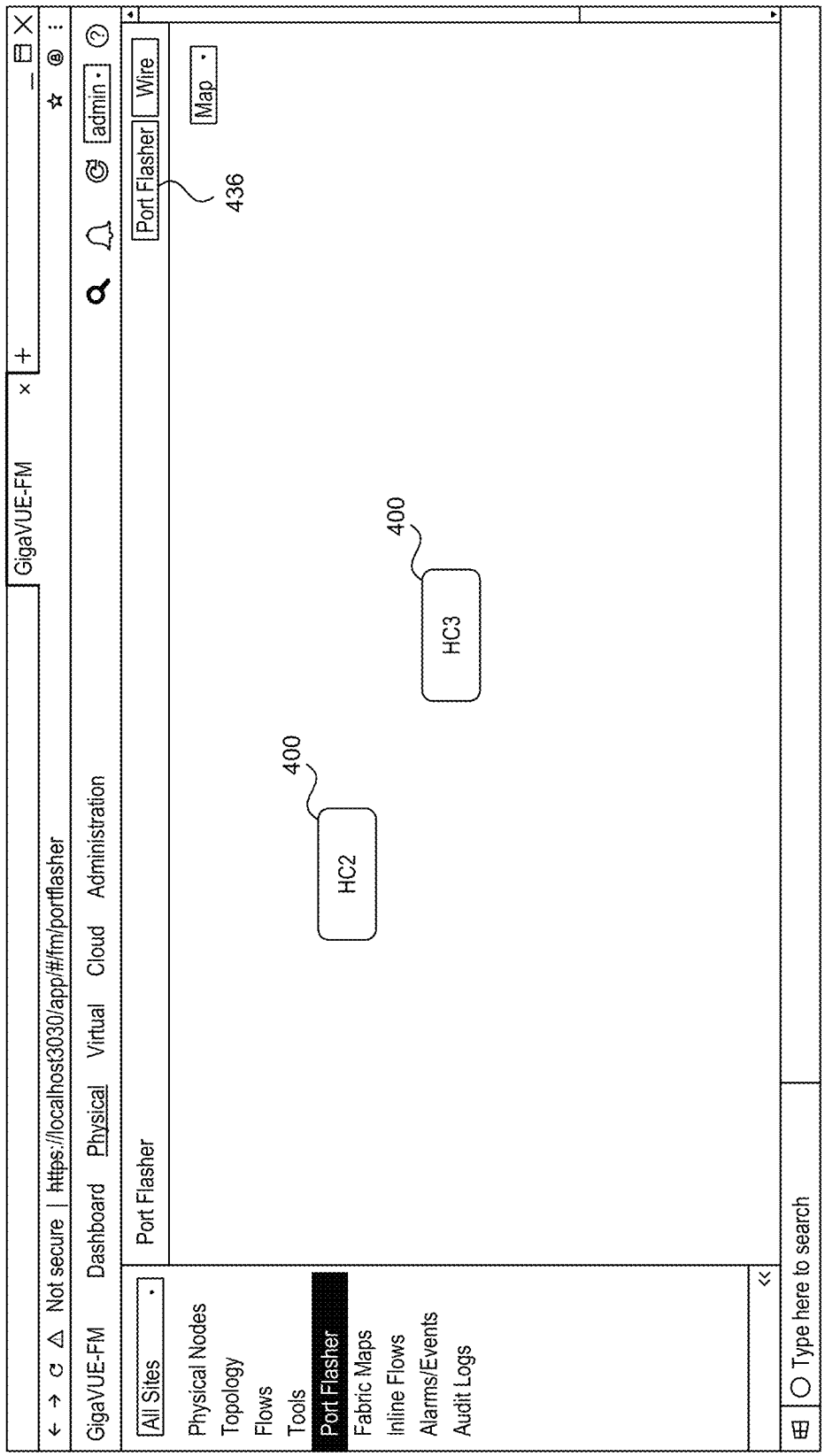
FIG. 4A shows a GUI screen that displays network appliances currently being managed by network visibility management software.

FIGS. 4A through 4D illustrate a series of GUI screens that may be generated by the GUI 316 of the network visibility management software 312, to carry out the techniques introduced here. Specifically, FIG. 4A illustrates a GUI screen 410 that displays two network appliances 400 currently being managed by the network visibility management software 312. In the illustrated example, no connections have yet been established between the network appliances 400. Each network appliance 400 can contain one or more stored data structures referred to as a "port maps," or simply "maps." A port map is a table or other similar data structure that maps one or more source ports to one or more destination ports within a network appliance. A port map can be established by use of the network visibility management software 312, which maintains knowledge of the map(s) in each network appliance 400.

Figure 4B:
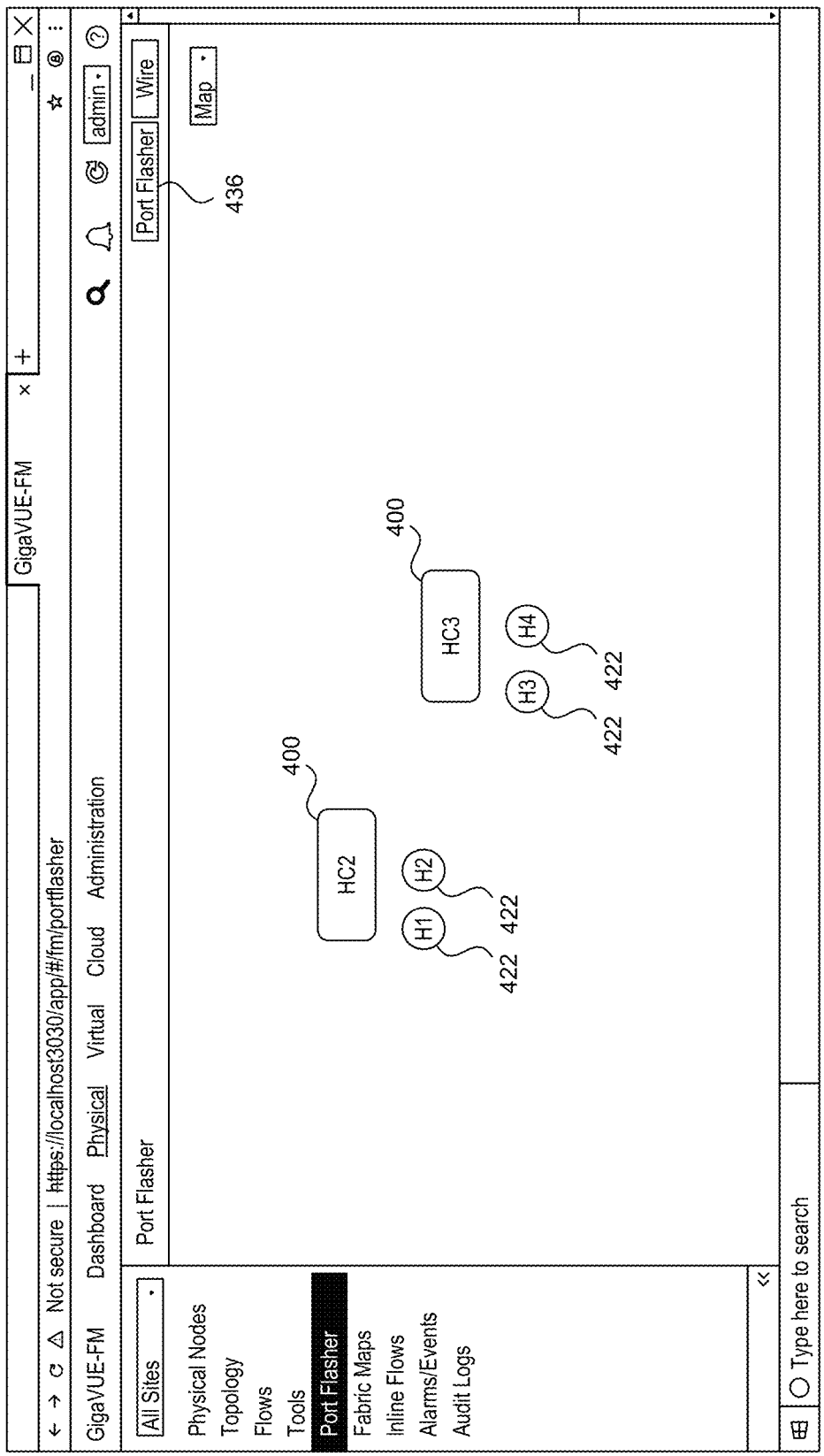
FIG. 4B shows a GUI screen that displays managed network appliances along with their associated port maps.
Figure 4C:
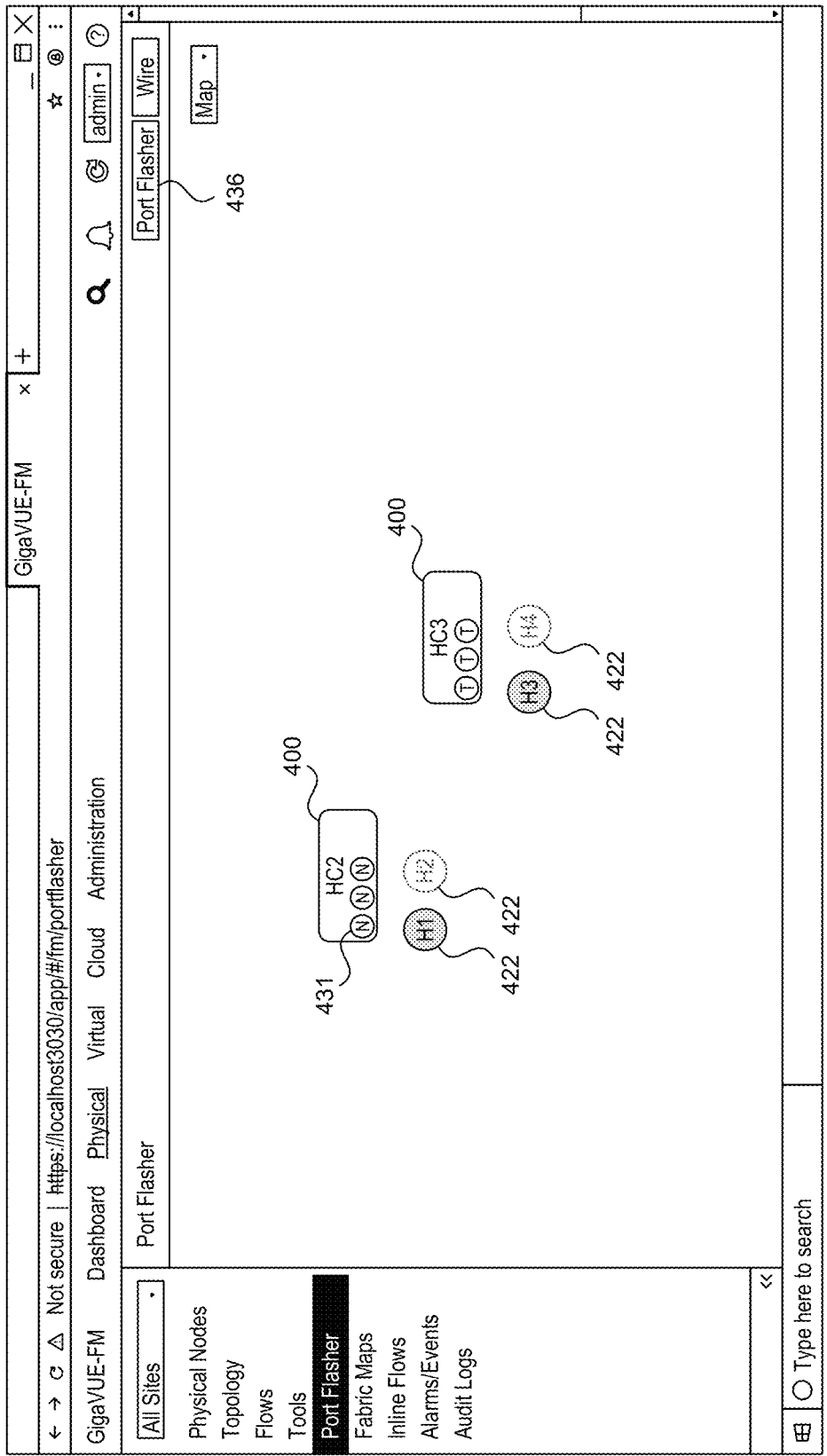
FIG. 4C illustrates an example of a GUI screen in which ports associated with a selected port map are displayed for each managed network appliance.

As shown in FIG. 4B, the GUI may display a screen 420 that further shows each port map associated with each network appliance 400 being managed. By selecting the symbol for any given port map using a mouse or other similar pointing device, the user can cause to be displayed the qualified ports associated with that port map. FIG. 4C illustrates an example of a GUI screen in which the physical ports 431 associated with a selected port map are displayed for each network appliance 400.

Figure 4D:
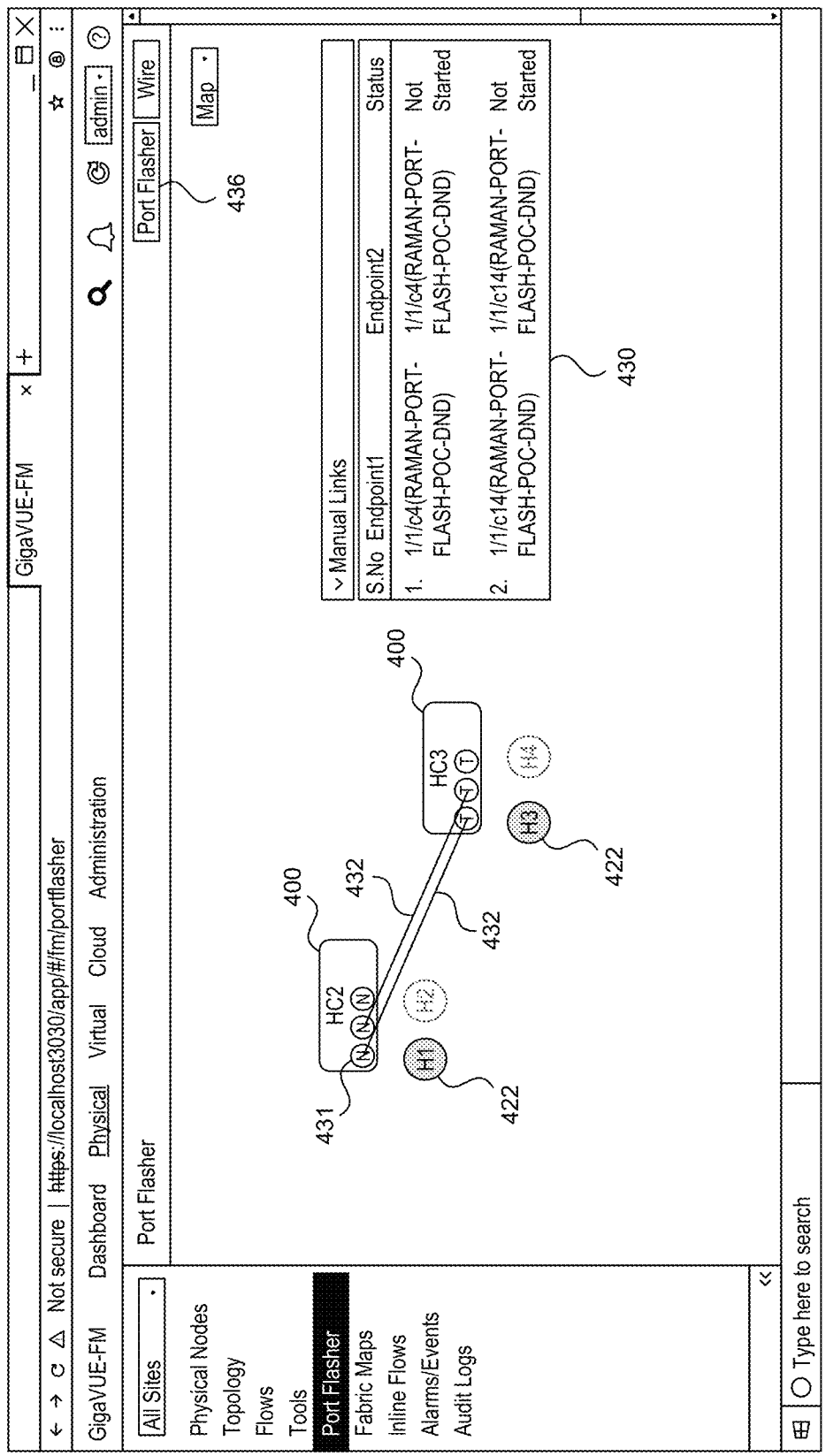
FIG. 4D shows an example of a GUI screen in which multiple connections have been graphically defined between two network appliances.

To establish a connection between two network appliances 400 (or other managed devices), a user first creates a logical link between a port on each of those devices. This may be done, for example, by first selecting an appropriate GUI control for creating a logical connection, and then sequentially clicking on the desired available ports to define the connection, or typing the port identifiers into a table 430. This action results in the GUI drawing a line (or other appropriate symbol) between the selected ports, to represent a logical connection between the ports. FIG. 4D shows an example of a GUI screen in which two connections 432 have been graphically defined, each between a different pair of ports on the two network appliances 400. Note that at this point the connections may be only logical connections, i.e., where physical connections have not yet been established.

Once a logical connection has been defined in the network visibility management software 312, when the user is ready to establish the connection physically (i.e., by connecting cable), the user can select the Port Flasher button 436 while the logical connection is selected in the GUI. This action causes the network visibility management software 312 to send a signal to each device that is part of the selected connection, triggering each such device to cause the visual indicator for the appropriate port to flash. For example, a port to be connected may flash a repeating pattern of amber-green-amber-green to indicate that is the port to be connected. The displayed symbol for those ports in the GUI may also flash in the same or a similar pattern and/or colors. Once a cable connector is physically plugged into the appropriate port, the visual indicator for the port changes its flashing pattern and/or color (e.g., to solid green). In that event the network appliance that has the port also sends a signal to the network visibility management software 312, which changes the displayed symbol for that port on the GUI accordingly. Additionally, the displayed symbol for the connection itself in the GUI may also change appearance (e.g., from red to green).

As noted above, the Port Flasher function can also be used for debugging purposes. For example, a particular connection displayed in the GUI may be known to be dropping data packets (it is assumed that each network appliance 400 has the ability to detect and report packet loss at any of its ports). The user may require assistance, however, in identifying which physical cable and ports embody that connection. Therefore, the user can select that connection in the GUI and then select the Port Flasher button, which action causes the LEDs for the physical ports of that connection to flash a predetermined pattern and/or color. By looking for the flashing LEDs, the user can easily identify the correct ports and cable for the problematic connection. Additionally, if any network appliance 400 detects packet loss on one of its links, it can cause the LED for the appropriate port to flash, and signal the network visibility management software 312 to cause the symbol for that port (and/or the connection) to flash on the GUI.

Figure 5:
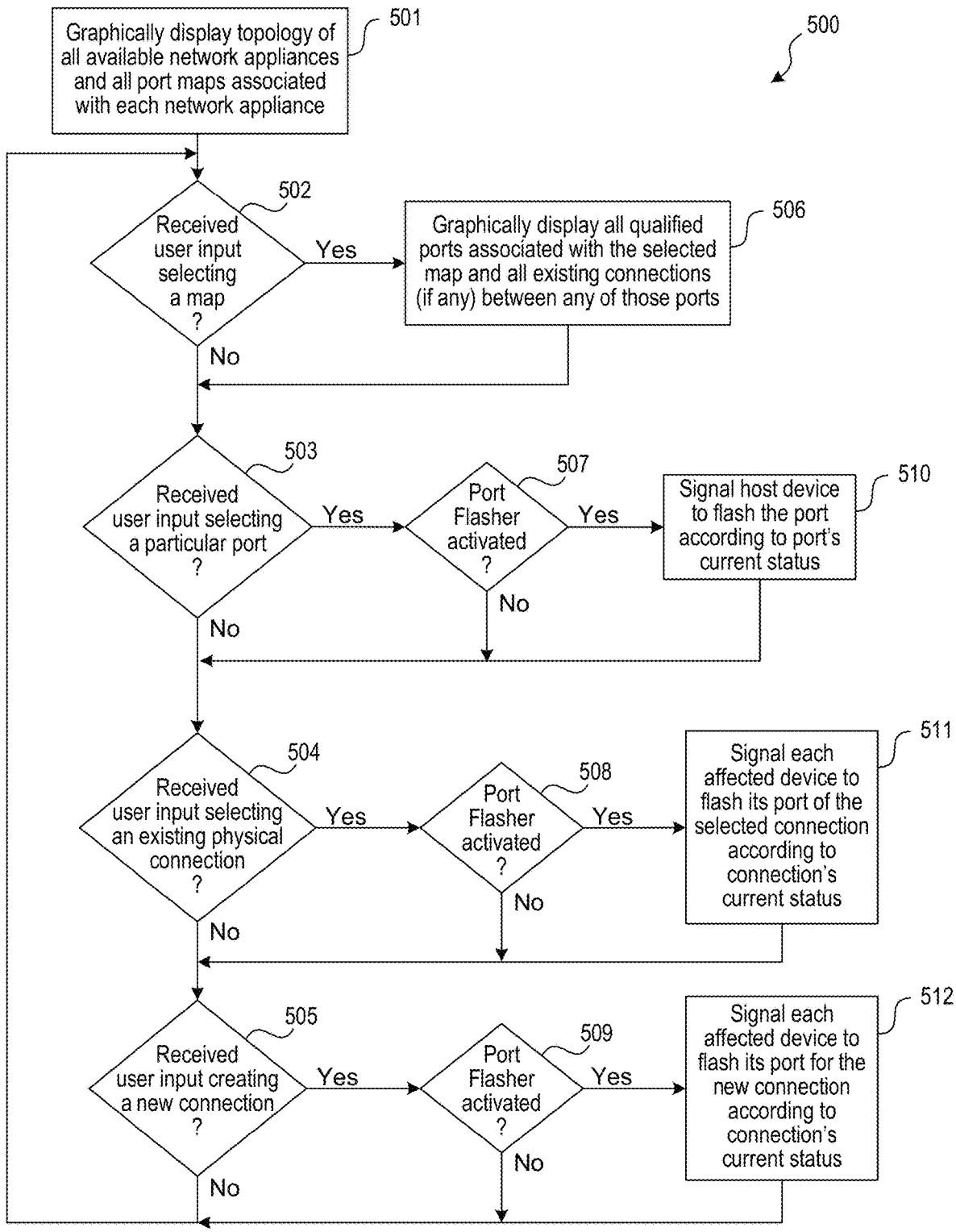
FIG. 5 shows an example of a process to assist in the physical wiring or debugging of connections.

FIG. 5 shows an example of a process 500 that may be performed by the network visibility management software 312 to assist in the physical wiring or debugging of connections, according to the techniques introduced here. Many variations upon this process are possible consistent with the techniques being introduced here. For example the ordering of some steps may be changed. Furthermore, some steps may be omitted, and other steps may be added.

Initially, at step 501 the process 500 graphically displays, via the GUI 316, a topology of all available network appliances at all port maps associated with each network appliance. Though not shown as part of this process, the user may also create or delete logical instances of network appliances to be managed, and perform various other functions, by use of the network visibility management software 312. At step 502 the process determines whether user input selecting a port map has been received by the GUI 316. If such a user input that has been received, then at step 506 the process graphically displays all qualified ports associated with the selected port map and all existing connections (if any) between any of those ports. After step 506, or if no such user input is received at step 502, the process then continues to step 503.

At step 503 the process 500 determines whether user input selecting the displayed graphical symbol of a particular port has been received by the GUI 316. If such user input has been received by the GUI 316, then the process 500 determines at step 507 whether the Port Flasher function has been activated. If the outcome of both step 503 and step 507 is affirmative, the process 500 then signals the host device of the selected port to flash the indicator for the port, according to the port's current status (which could be, for example, "connected," "not connected," or "connected and transmitting/receiving data"). After performing step 510, or if the outcome of either step 503 or step 507 is negative, the process continues to step 504.

At step 504 the process 500 determines whether user input selecting the displayed graphical symbol of an existing physical connection has been received by the GUI 316. If such user input has been received by the GUI 316, then the process 500 determines at step 508 whether the Port Flasher function has been activated. If the outcome of both step 504 and step 508 is affirmative, the process 500 then signals each device that has a port that is an endpoint part of the connection to flash the indicator for the port, according to the connection's current status (which could be, for example, "connected" or "connected and transmitting/receiving data"). After performing step 511, or if the outcome of either step 504 or step 508 is negative, the process continues to step 505.

At step 505 the process 500 determines whether user input creating a new logical connection has been received by the GUI 316. This may occur, for example, after the user has created the connection in software and is ready to physically wire the connection, and therefore desires visual assistance in locating the correct physical ports. If such user input has been received by the GUI 316, then the process 500 determines at step 509 whether the Port Flasher function has been activated. If the outcome of both step 505 and step 509 is affirmative, the process 500 then signals each device that has a port that is an endpoint part of the new connection to flash the indicator for the port, according to the connection's current status (which in this case would be "not connected"). After performing step 512, or if the outcome of either step 505 or step 509 is negative, the process loops back to step 502.

Note that while the above description describes software based configuration of a given connection being immediately followed by the act of physical wiring, the Port Flasher feature can also act as a demarcation point between configuration and wiring. For example, a network administrator may be at a remote site, such that all of the connections can be configured by the network administrator using the network visibility management software 312, which creates a connection list that stays in a queue. The wiring technician at the field site can then start physically connecting the ports according to the list, based on ports flashing using the Port Flasher feature.

Figure 6:
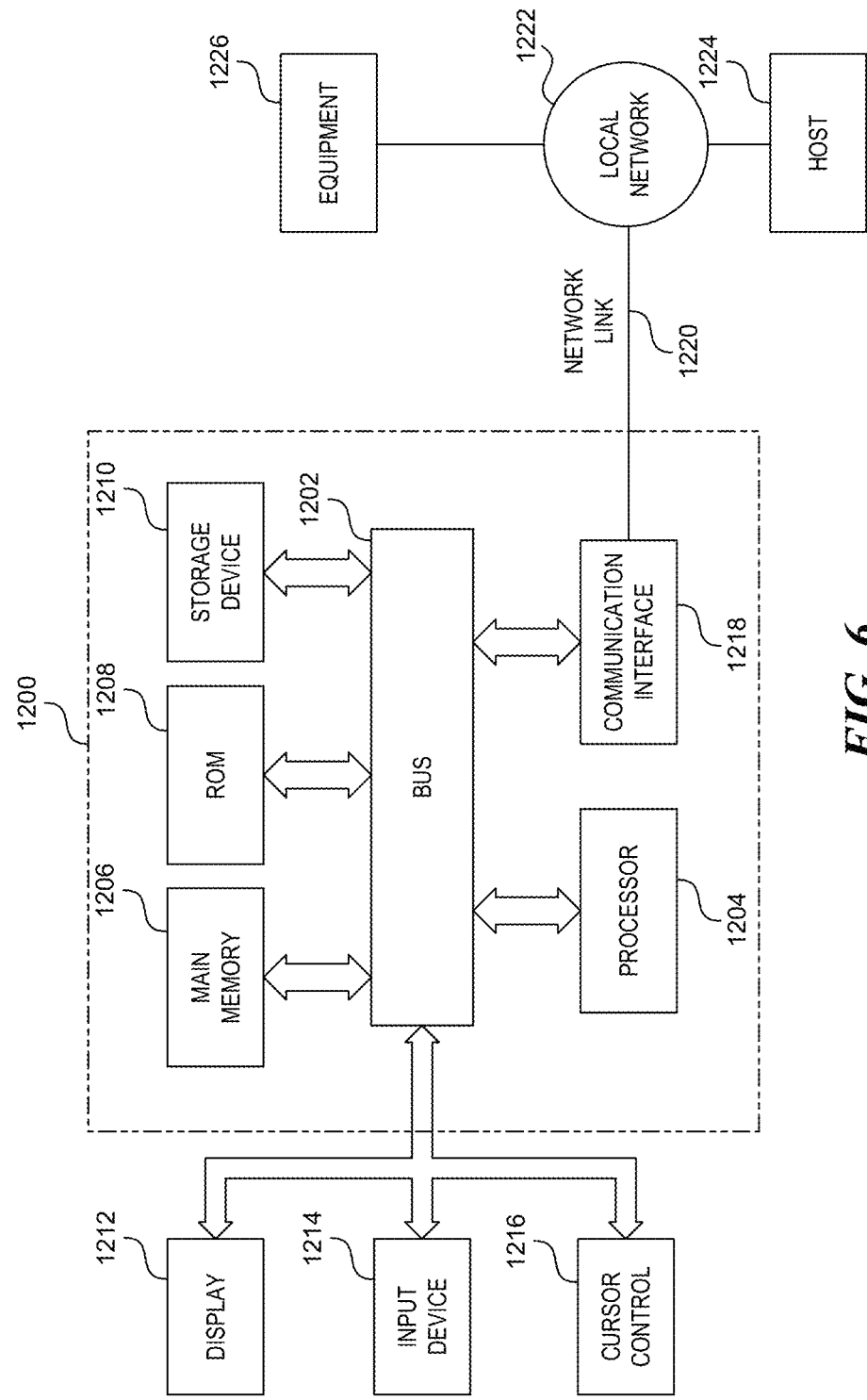
FIG. 6 is a block diagram of an example of a computer system 1200 or other similar device in which techniques described herein may be implemented

FIG. 6 is a block diagram of an example of a computer system 1200 or other similar device in which techniques described herein may be implemented. For example, in some embodiments, system 1200 may represent the computer system 314 of FIG. 3B. Similarly, system 1200 may represent a network visibility appliance, such as any of network appliances 100, 200 and 300 in FIGS. 1 through 3B.

As shown, system 1200 includes a bus 1202 or other communication mechanism for communicating information, and a processor 1204 coupled with the bus 1202 for processing information. The processor 1204 may be used to perform various functions described herein. For example, in some embodiments, the processor 1204 may receive input from a user for selecting or defining a connection, or for signaling a device to flash a port indicator.

The system 1200 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution of instructions to be executed by the processor 1204. The computer system 1200 further includes a read only memory (ROM) 1208 or other static storage device coupled to the bus 1202 for storing static information and instructions for the processor 1204. A data storage device 1210, such as a magnetic or optical disk, is provided and coupled to the bus 1202 for storing information and instructions.

The system 1200 may be coupled via the bus 1202 to a display 1212, such as a cathode ray tube (CRT) or a LCD monitor, for displaying information to a user. An input device 1214, including alphanumeric and other keys, is coupled to the bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212.

The system 1200 may be used for performing various functions in accordance with the techniques described herein. According to one embodiment, such use is provided by system 1200 in response to processor 1204 executing one or more sequences of one or more instructions contained in the main memory 1206. Such instructions may be read into the main memory 1206 from another computer-readable medium, such as storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement features of the embodiments described herein. Thus, embodiments described herein are not limited to any specific combination of hardware circuitry and software.

Unless contrary to physical possibility, it is envisioned that (i) the methods/steps described herein may be performed in any sequence and/or in any combination, and that (ii) the components of respective embodiments may be combined in any manner.

The machine-implemented operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, means: a) special-purpose hardwired circuitry, such as one or more application-specific integrated circuits (ASICs), programmable logic devices (PLDs), field programmable gate arrays (FPGAs), or other similar device(s); b) programmable circuitry programmed with software and/or firmware, such as one or more programmed general-purpose microprocessors, digital signal processors (DSPs) and/or microcontrollers, system-on-a-chip systems (SOCs), or other similar device(s); or c) a combination of the forms mentioned in a) and b).

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

EXAMPLES OF CERTAIN EMBODIMENTS

Certain embodiments of the technology introduced herein are summarized in the following numbered examples:

1. A method comprising: receiving, in a computer system, first user input that specifies a first port of a plurality of selectable physical ports or a connection between the first port and a second port of the plurality of selectable physical ports, at least one of the first port or the second port being on a network appliance that is external to the computer system; and in response to the first user input, sending a first signal from the computer system to the network appliance to trigger the network appliance to output a first visual indication in proximity to the first port, the first visual indication identifying the first port and a status of at least one of the first port or the connection.

2. A method as recited in example 1, wherein the first user input specifies the first port.

3. A method as recited in example 1 or example 2, wherein the first user input specifies the connection.

4. A method as recited in any of examples 1 through 3, wherein the second port is on a second device that is external to the computer system, the method further comprising: in response to the first user input, sending a second signal from the computer system to the second device concurrently with sending the first signal, to cause the second device to output a second visual indication in proximity to the second port, the second visual indication identifying the second port and a status of at least one of the second port or the connection.

5. A method as recited in any of examples 1 through 4, wherein the first user input specifies an existing physical connection between the first port and the second port.

6. A method as recited in any of examples 1 through 4, wherein the first user input specifies a physical connection that is to be created between the first port and the second port.

7. A method as recited in any of examples 1 through 6, further comprising: in response to the first user input, sending a second signal from the computer system concurrently with sending the first signal, to cause a device to output a second visual indication in proximity to the second port, the second visual indication identifying the second port and a status of at least one of the second port or the connection.

8. A method as recited in any of examples 1 through 7, wherein the second port is a second device that is external to the computer system.

9. A method as recited in any of examples 1 through 8, wherein the first user input specifies an existing physical connection between the first port and the second port, the method further comprising: in response to the first user input, sending a second signal from the computer system concurrently with sending the first signal, to cause a device to output a second visual indication in proximity to the second port, the second visual indication identifying the second port and a status of at least one of the second port or the connection.

10. A method as recited in any of examples 1 through 9, wherein the second port is on a second device that is external to the computer system.

11. A method as recited in any of examples 1 through 10, wherein the first user input specifies the connection, and wherein the first visual indication identifies the first port as a port of the connection before the connection has been physically established.

12. A method as recited in any of examples 1 through 11, wherein the first visual indication indicates whether the first port is properly connected to the second port.

13. A method as recited in any of examples 1 through 12, further comprising: generating, by the computer system, display data for a graphical user interface to graphically represent the network appliance and the plurality of selectable physical ports, the display data including data indicative of statuses of the first and second ports and the connection; and causing display, by the computer system, of the display data to indicate graphically the statuses of the first and second ports and the connection to a user.

14. A method as recited in any of examples 1 through 13, wherein said causing display comprises causing display of an indication of whether the first port is physically connected to the second port.

15. A method as recited in any of examples 1 through 14, further comprising: causing display, by the computer system, of graphical indications of a plurality of maps maintained by the network appliance, each of the plurality of maps being associated with a plurality of qualified physical ports of the network appliance; receiving, by the computer system, second user input selecting a map of the plurality of maps; and in response to the second user input, causing display, by the computer system, of indicators of the qualified physical ports associated with the selected map.

16. A method as recited in any of examples 1 through 15, wherein the first user input specifies at least one of the indicators of the qualified physical ports associated with the selected map.

17. A method as recited in any of examples 1 through 16, wherein the network appliance is configured to receive data packets from a source on a network other than said computer system, and to forward the data packets to a tool that is external to the network appliance.

18. A method as recited in any of examples 1 through 17, wherein said method is performed by a network management application configured to manage at least the network appliance.

19. A non-transitory computer program storage medium storing instructions, execution of which in a computer system causes the computer system to execute a process comprising: receiving first user input that specifies a first port of a plurality of selectable physical ports or a connection between the first port and a second port of the plurality of selectable physical ports, at least one of the first port or the second port being on a network appliance that is external to the computer system; and in response to the first user input, sending a first signal from the computer system to the network appliance to trigger the network appliance to output a first visual indication in proximity to the first port, the first visual indication identifying the first port and a status of at least one of the first port or the connection.

20. A non-transitory computer program storage medium as recited in example 19, wherein the first user input specifies the first port.

21. A non-transitory computer program storage medium as recited in example 19 or example 20, wherein the first user input specifies the connection.

22. A non-transitory computer program storage medium as recited in any of examples 19 through 21, wherein the second port is on a second device that is external to the computer system, the process further comprising: in response to the first user input, sending a second signal from the computer system to the second device concurrently with sending the first signal, to cause the second device to output a second visual indication in proximity to the second port, the second visual indication identifying the second port and a status of at least one of the second port or the connection.

23. A non-transitory computer program storage medium as recited in any of examples 19 through 22, wherein the first user input specifies an existing physical connection between the first port and the second port.

24. A non-transitory computer program storage medium as recited in any of examples 19 through 22, wherein the first user input specifies a physical connection that is to be created between the first port and the second port.

25. A non-transitory computer program storage medium as recited in any of examples 19 through 24, the process further comprising: in response to the first user input, sending a second signal from the computer system concurrently with sending the first signal, to cause a device to output a second visual indication in proximity to the second port, the second visual indication identifying the second port and a status of at least one of the second port or the connection.

26. A non-transitory computer program storage medium as recited in any of examples 19 through 25, wherein the second port is on a second device that is external to the computer system.

27. A non-transitory computer program storage medium as recited in any of examples 19 through 26, wherein the first user input specifies an existing physical connection between the first port and the second port, the process further comprising: in response to the first user input, sending a second signal from the computer system concurrently with sending the first signal, to cause a device to output a second visual indication in proximity to the second port, the second visual indication identifying the second port and a status of at least one of the second port or the connection.

28. A non-transitory computer program storage medium as recited in any of examples 19 through 27, wherein the second port is on a second device that is external to the computer system.

29. A non-transitory computer program storage medium as recited in any of examples 19 through 28, wherein the first user input specifies the connection, and wherein the first visual indication identifies the first port as a port of the connection before the connection has been physically established.

30. A non-transitory computer program storage medium as recited in any of examples 19 through 29, wherein the first visual indication indicates whether the first port is properly connected to the second port.

31. A non-transitory computer program storage medium as recited in any of examples 19 through 30, the process further comprising: generating display data for a graphical user interface to graphically represent the network appliance and the plurality of selectable physical ports, the display data including data indicative of statuses of the first and second ports and the connection; and causing display of the display data to indicate graphically the statuses of the first and second ports and the connection to a user.

32. A non-transitory computer program storage medium as recited in any of examples 19 through 31, wherein said causing display comprises causing display of an indication of whether the first port is physically connected to the second port.

33. A non-transitory computer program storage medium as recited in any of examples 19 through 32, the process further comprising: causing display of graphical indications of a plurality of maps maintained by the network appliance, each of the plurality of maps being associated with a plurality of qualified physical ports of the network appliance: receiving second user input selecting a map of the plurality of maps; and in response to the second user input, causing display of indicators of the qualified physical ports associated with the selected map.

34. A non-transitory computer program storage medium as recited in any of examples 19 through 33, wherein the first user input specifies at least one of the indicators of the qualified physical ports associated with the selected map.

35. A non-transitory computer program storage medium as recited in any of examples 19 through 34, wherein the network appliance is configured to receive data packets from a source on a network other than said computer system, and to forward the data packets to a tool that is external to the network appliance.

36. A non-transitory computer program storage medium as recited in any of examples 19 through 35, wherein the instructions are part of a network management application configured to manage at least the network appliance.

37. A network appliance comprising: a first plurality of physical ports of the network appliance, including a first network port through which to receive data packets from a source node on a network; a first tool port through which to forward the data packets to an tool that is external to the network appliance; a second tool port through which to receive the data packets from the tool after forwarding the data packets to the tool; a second network port through which to forward the data packets to a destination node on the network; first circuitry to selectively couple the first and second network ports to the first and second tool ports; a plurality of visual indicators, each associated with a separate respective one of the first plurality of physical ports; and second circuitry configured to perform operations including receiving a first signal from a computer system that is external to the network appliance, the first signal being indicative that the computer system has received first user input specifying a first port of a plurality of selectable physical ports or a connection between the first port and a second port of the plurality of selectable physical ports, at least one of the first port or the second port being one of the first plurality of physical ports of the network appliance; and in response to receiving the first signal, causing one of the plurality of visual indicators in proximity to the first port to output a first visual indication identifying the first port and a status of at least one of the first port or the connection.

38. A network appliance as recited in example 37, the first user input specifying the first port.

39. A network appliance as recited in example 37 or example 38, the first user input specifying the connection.

40. A network appliance as recited in any of examples 37 through 39, the first user input specifying an existing physical connection between the first port and the second port.

41. A network appliance as recited in examples 37 through 39, the first user input specifying a physical connection that is to be created between the first port and the second port.

42. A network appliance as recited in examples 37 through 41, wherein the first visual indication identifies the first port as a port of the connection before the connection has been physically established.

43. A network appliance as recited in examples 37 through 42, wherein the first visual indication indicates whether the first port is properly connected to the second port.

44. An apparatus comprising: means for receiving, in a computer system, first user input that specifies a first port of a plurality of selectable physical ports or a connection between the first port and a second port of the plurality of selectable physical ports, at least one of the first port or the second port being on a network appliance that is external to the computer system; and means for sending, in response to the first user input, a first signal from the computer system to the network appliance to trigger the network appliance to output a first visual indication in proximity to the first port, the first visual indication identifying the first port and a status of at least one of the first port or the connection.

45. An apparatus as recited in example 44, wherein the first user input specifies the first port.

46. An apparatus as recited in example 44 or example 45, wherein the first user input specifies the connection.

47. An apparatus as recited in any of examples 44 through 46, wherein the second port is on a second device that is external to the computer system, the method further comprising: in response to the first user input, sending a second signal from the computer system to the second device concurrently with sending the first signal, to cause the second device to output a second visual indication in proximity to the second port, the second visual indication identifying the second port and a status of at least one of the second port or the connection.

48. An apparatus as recited in any of examples 44 through 47, wherein the first user input specifies an existing physical connection between the first port and the second port.

49. An apparatus as recited in any of examples 44 through 47, wherein the first user input specifies a physical connection that is to be created between the first port and the second port.

50. An apparatus as recited in any of examples 44 through 49, further comprising: in response to the first user input, sending a second signal from the computer system concurrently with sending the first signal, to cause a device to output a second visual indication in proximity to the second port, the second visual indication identifying the second port and a status of at least one of the second port or the connection.

51. An apparatus as recited in any of examples 44 through 50, wherein the second port is a second device that is external to the computer system.

52. An apparatus as recited in any of examples 44 through 51, wherein the first user input specifies an existing physical connection between the first port and the second port, the method further comprising: in response to the first user input, sending a second signal from the computer system concurrently with sending the first signal, to cause a device to output a second visual indication in proximity to the second port, the second visual indication identifying the second port and a status of at least one of the second port or the connection.

53. An apparatus as recited in any of examples 44 through 52, wherein the second port is on a second device that is external to the computer system.

54. An apparatus as recited in any of examples 44 through 53, wherein the first user input specifies the connection, and wherein the first visual indication identifies the first port as a port of the connection before the connection has been physically established.

55. An apparatus as recited in any of examples 44 through 54, wherein the first visual indication indicates whether the first port is properly connected to the second port.

56. An apparatus as recited in any of examples 44 through 55, further comprising: generating, by the computer system, display data for a graphical user interface to graphically represent the network appliance and the plurality of selectable physical ports, the display data including data indicative of statuses of the first and second ports and the connection; and causing display, by the computer system, of the display data to indicate graphically the statuses of the first and second ports and the connection to a user.

57. An apparatus as recited in any of examples 44 through 56, wherein said causing display comprises causing display of an indication of whether the first port is physically connected to the second port.

58. An apparatus as recited in any of examples 44 through 57, further comprising: causing display, by the computer system, of graphical indications of a plurality of maps maintained by the network appliance, each of the plurality of maps being associated with a plurality of qualified physical ports of the network appliance; receiving, by the computer system, second user input selecting a map of the plurality of maps; and in response to the second user input, causing display, by the computer system, of indicators of the qualified physical ports associated with the selected map.

59. An apparatus as recited in any of examples 44 through 58, wherein the first user input specifies at least one of the indicators of the qualified physical ports associated with the selected map.

60. An apparatus as recited in any of examples 44 through 59, wherein the network appliance is configured to receive data packets from a source on a network other than said computer system, and to forward the data packets to a tool that is external to the network appliance.

61. An apparatus as recited in any of examples 44 through 60, wherein said method is performed by a network management application configured to manage at least the network appliance.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
receiving, in a computer system, first user input that specifies a first port of a plurality of selectable physical ports or a particular connection to be established between the first port and a second port of the plurality of selectable physical ports, at least one of the first port or the second port being on a network appliance that is one of a plurality of devices external to the computer system,
wherein a logical link is established between the first port and the second port by the computer system to represent the particular connection that is to be physically established, and
wherein the computer system accesses at least one data structure identifying ports of the plurality of devices external to the computer system;
in response to the first user input, sending a first signal from the computer system to the network appliance to trigger the network appliance to output a first visual indication in proximity to the first port, the first visual indication identifying the first port and a status of at least one of the first port or the particular connection to be established, wherein before the particular connection has been physically established, the first visual indication identifies the first port as one of a pair of ports that will form the particular connection, as visual guidance for an entity tasked with connecting a cable to the first port to establish physically at least one end of the particular connection; and
in response to the first user input, sending a second signal from the computer system to a device, wherein the device is one of the network appliance or a second device external to the computer system, and
wherein the method is performed while neither the first port nor the second port has a physical cable connected thereto.

2. A method as recited in claim 1, further comprising: generating, by the computer system, display data for a graphical user interface to graphically represent the network appliance and the plurality of selectable physical ports, the display data including data indicative of statuses of the first and second ports and the particular connection; and
causing display, by the computer system, of the display data to indicate graphically the statuses of the first and second ports and the particular connection to a user.

3. A method as recited in claim 2, wherein said causing display comprises causing display of an indication of whether the first port is physically connected to the second port.

4. A method as recited in claim 1, further comprising: causing display, by the computer system, of graphical indications of a plurality of maps maintained by the network appliance, each of the plurality of maps being associated with a plurality of qualified physical ports of the network appliance;
receiving, by the computer system, second user input selecting a map of the plurality of maps; and
in response to the second user input, causing display, by the computer system, of indicators of the qualified physical ports associated with the selected map.

5. A method as recited in claim 4, wherein the first user input specifies at least one of the indicators of the qualified physical ports associated with the selected map.

6. A method as recited in claim 1, wherein the network appliance is configured to receive data packets from a source on a network other than said computer system, and to forward the data packets to a tool that is external to the network appliance.

7. A method as recited in claim 6, wherein said method is performed by a network management application configured to manage at least the network appliance.

8. A method as recited in claim 1, wherein the first user input specifies the first port.

9. A method as recited in claim 1, wherein the first user input specifies the particular connection.

10. A method as recited in claim 1, wherein the second port is on a second device that is external to the computer system, the method further comprising:
in response to the first user input, sending the second signal from the computer system to the second device concurrently with sending the first signal, to cause the second device to output a second visual indication in proximity to the second port, such that the second visual indication is closer to the second port than to any other port, the second visual indication identifying the second port and a status of at least one of the second port or the particular connection, wherein before the particular connection has been physically established, the second visual indication identifies the second port as one of the ports that will form the particular connection, as visual guidance for physically establishing the particular connection.

11. A method as recited in claim 1, further comprising:
in response to the first user input, sending the second signal from the computer system concurrently with sending the first signal, to cause a device to output a second visual indication in proximity to the second port, such that the second visual indication is closer to the second port than to any other port, the second visual indication identifying the second port and a status of at least one of the second port or the particular connection.

12. A method as recited in claim 1, wherein the second port is on a second device that is external to the computer system.

13. A method as recited in claim 1, wherein the first user input specifies the particular connection.

14. A method as recited in claim 1, wherein the first visual indication indicates whether the first port is properly connected to the second port.

15. A non-transitory computer program storage medium storing instructions, execution of which in a computer system causes the computer system to execute a process comprising:
receiving first user input that specifies a first port of a plurality of selectable physical ports or a particular connection to be established between the first port and a second port of the plurality of selectable physical ports, at least one of the first port or the second port being on a network appliance that is one of a plurality of devices external to the computer system,
wherein a logical link is established between the first port and the second port by the computer system to represent the particular connection that is to be physically established, and
wherein the computer system accesses at least one data structure identifying ports of the plurality of devices external to the computer system;
in response to the first user input, sending a first signal from the computer system to the network appliance to trigger the network appliance to output a first visual indication in proximity to the first port, the first visual indication identifying the first port and a status of at least one of the first port or the particular connection to be established, wherein before the particular connection has been physically established, the first visual indication identifies the first port as one of a pair of ports that will form the particular connection, as visual guidance for an entity tasked with connecting a cable to the first port to establish physically at least one end of the particular connection; and
in response to the first user input, sending a second signal from the computer system to a device, wherein the device is one of the network appliance or a second device external to the computer system, and wherein the process is performed while neither the first port nor the second port has a physical cable connected thereto.

16. A non-transitory computer program storage medium as recited in claim 15, wherein the first user input specifies a physical connection that is to be created between the first port and the second port.

17. A non-transitory computer program storage medium as recited in claim 16, the process further comprising:
in response to the first user input, sending the second signal from the computer system concurrently with sending the first signal, to cause a device to output a second visual indication in proximity to the second port, such that the second visual indication is closer to the second port than to any other port, the second visual indication identifying the second port and a status of at least one of the second port or the particular connection.

18. A non-transitory computer program storage medium as recited in claim 16, wherein the second port is on a second device that is external to the computer system.

19. A non-transitory computer program storage medium as recited in claim 15, the process further comprising:
generating display data for a graphical user interface to graphically represent the network appliance and the plurality of selectable physical ports, the display data including data indicative of statuses of the first and second ports and the particular connection; and
causing display of the display data to indicate graphically the statuses of the first and second ports and the particular connection to a user.

20. A non-transitory computer program storage medium as recited in claim 19, wherein said causing display comprises causing display of an indication of whether the first port is physically connected to the second port.

21. A non-transitory computer program storage medium as recited in claim 15, the process further comprising:
causing display of graphical indications of a plurality of maps maintained by the network appliance, each of the plurality of maps being associated with a plurality of qualified physical ports of the network appliance:
receiving second user input selecting a map of the plurality of maps; and
in response to the second user input, causing display of indicators of the qualified physical ports associated with the selected map.

22. A non-transitory computer program storage medium as recited in claim 21, wherein the first user input specifies at least one of the indicators of the qualified physical ports associated with the selected map.

23. A non-transitory computer program storage medium as recited in claim 15, wherein the network appliance is configured to receive data packets from a source on a network other than said computer system, and to forward the data packets to a tool that is external to the network appliance.

24. A non-transitory computer program storage medium as recited in claim 23, wherein the instructions are part of a network management application configured to manage at least the network appliance.

25. A non-transitory computer program storage medium as recited in claim 15, wherein the first user input specifies the first port.

26. A non-transitory computer program storage medium as recited in claim 15, wherein the first user input specifies the particular connection.

27. A non-transitory computer program storage medium as recited in claim 15, wherein the second port is on a second device that is external to the computer system, the process further comprising:

in response to the first user input, sending the second signal from the computer system to the second device concurrently with sending the first signal, to cause the second device to output a second visual indication in proximity to the second port, such that the second visual indication is closer to the second port than to any other port, the second visual indication identifying the second port and a status of at least one of the second port or the particular connection, wherein before the particular connection has been physically established, the second visual indication identifies the second port as one of the ports that will form the particular connection, as visual guidance for physically establishing the particular connection.

28. A non-transitory computer program storage medium as recited in claim 15, wherein the second port is on a second device that is external to the computer system.

29. A non-transitory computer program storage medium as recited in claim 15, wherein the first visual indication indicates whether the first port is properly connected to the second port.

30. A network appliance comprising:

a first plurality of physical ports of the network appliance, including a first network port through which to receive data packets from a source node on a network;

a first tool port through which to forward the data packets to a tool that is external to the network appliance;

a second tool port through which to receive the data packets from the tool after forwarding the data packets to the tool;

a second network port through which to forward the data packets to a destination node on the network;

first circuitry to selectively couple the first and second network ports to the first and second tool ports;

a plurality of visual indicators, each associated with a separate respective one of the first plurality of physical ports; and second circuitry configured to perform operations including receiving a first signal from a computer system that is external to the network appliance, the first signal being indicative that the computer system has received first user input specifying a first port of a plurality of selectable physical ports or a particular connection between the first port and a second port of the plurality of selectable physical ports, at least one of the first port or the second port being one of the first plurality of physical ports of the network appliance, the computer system having established a logical link between the first port and the second port to represent the particular connection; and in response to receiving the first signal, causing one of the plurality of visual indicators in proximity to the first port to output a first visual indication identifying the first port and a status of at least one of the first port or the particular connection, wherein said receiving and said causing are performed while neither the first port nor the second port has a physical cable connected thereto.

31. A network appliance as recited in claim 30, the first user input specifying a physical connection that is to be created between the first port and the second port.

32. A network appliance as recited in claim 31, wherein the first visual indication identifies the first port as a port of the particular connection before the particular connection has been physically established.

33. A network appliance as recited in claim 30, the first user input specifying the first port.

34. A network appliance as recited in claim 30, the first user input specifying the particular connection.

35. A network appliance as recited in claim 30, the first user input specifying an existing physical particular connection between the first port and the second port.

36. A network appliance as recited in claim 30, wherein the first visual indication indicates whether the first port is properly connected to the second port.

\* \* \* \* \*